(12) United States Patent
Standal et al.

(10) Patent No.: US 8,033,302 B2
(45) Date of Patent: Oct. 11, 2011

(54) POLYMER MATRIX REINFORCED STIFFENING ELEMENT

(75) Inventors: Roar Standal, Bergen (NO); Henrik Bang-Andreasen, Bergen (NO)

(73) Assignee: SeaProof Solutions AS, Bergen (NO)

( * ) Notice: Subject to any disclaimer, the term of this patent is extended or adjusted under 35 U.S.C. 154(b) by 410 days.

(21) Appl. No.: 12/304,476

(22) PCT Filed: Jun. 15, 2007

(86) PCT No.: PCT/NO2007/000210
§ 371 (c)(1),
(2), (4) Date: Dec. 12, 2008

(87) PCT Pub. No.: WO2007/145532
PCT Pub. Date: Dec. 21, 2007

(65) Prior Publication Data
US 2009/0199923 A1 Aug. 13, 2009

Related U.S. Application Data (60) Provisional application No. 60/804,940, filed on Jun. 16, 2006.

(51) Int. Cl.
*F16L 57/00* (2006.01)
*B29C 45/14* (2006.01)

(52) U.S. Cl. ........ 138/126; 138/123; 138/124; 138/109; 138/172

(58) Field of Classification Search .......... 138/123–125, 138/110, 172, 177, 178, 109, 174
See application file for complete search history.

(56) References Cited

U.S. PATENT DOCUMENTS

| | | | | |
|---|---|---|---|---|
| 4,367,967 A * | 1/1983 | Albert, Jr. | ...... | 403/41 |
| 4,786,536 A * | 11/1988 | Kaempen | ...... | 428/36.3 |
| 4,794,957 A * | 1/1989 | Metzler, Jr. | ...... | 138/109 |
| 5,285,744 A * | 2/1994 | Grantham et al. | ...... | 141/59 |
| 5,301,940 A | 4/1994 | Seki et al. | | |
| 5,526,846 A * | 6/1996 | Maloberti | ...... | 138/109 |
| 5,816,622 A * | 10/1998 | Carter | ...... | 285/45 |
| 5,909,007 A * | 6/1999 | Nøholmen | ...... | 174/135 |
| 6,220,303 B1 * | 4/2001 | Secher et al. | ...... | 138/110 |
| 6,374,022 B1 * | 4/2002 | Parmigiani et al. | ...... | 385/100 |
| 7,469,722 B2 * | 12/2008 | Berland | ...... | 138/155 |
| 7,568,861 B2 * | 8/2009 | Godoy et al. | ...... | 405/211 |
| 2007/0024051 A1* | 2/2007 | Witz et al. | ...... | 285/242 |

FOREIGN PATENT DOCUMENTS

| | | |
|---|---|---|
| GB | 2248729 | 4/1992 |
| GB | 2248729 A * | 4/1992 |
| WO | WO 94/09245 | 4/1994 |

* cited by examiner

*Primary Examiner* — Patrick F Brinson
(74) *Attorney, Agent, or Firm* — Christian D. Abel (57) ABSTRACT

A bend stiffener, and a method of producing the same, comprising an elongated cylinder of a polymer material, having a termination interface (4) on at least one end. An internal reinforcement matrix is provided comprising a first layer of a cylindrically arranged woven material (2). The material of the first layer is unwoven at the termination end, the unwoven fibers engage the termination member (3) and pass back over the first layer. The returning fibers of the second layer may be cut at a plurality of lengths to provide zones (10, 11, 12) of decreasing fiber density from the termination end.

19 Claims, 9 Drawing Sheets

POLYMER MATRIX REINFORCED STIFFENING ELEMENT

This application claims the benefit under 35 USC §119(e) to U.S. Provisional Application 60/804,940 filed, 16 Jun. 2006.

FIELD OF THE INVENTION

The current invention relates to elastomer matrix reinforced protection elements resistant to bending and tolerant of harsh environmental conditions.

BACKGROUND

U.S. Pat. No. 5,526,846 discloses a bend stiffener comprising an elastic member made of elastomer which surrounds a elongate body to be stiffened, the elastic member being integrally attached to one end of a housing support. It comprises, inside the elastic material, a reinforcement member extending over a portion of the length of the elastic member from one end, the reinforcement being integrally attached by means for fastening to said housing support.

The specific reinforcement members disclosed in '846' are:
- A toroid ring held axially by a plurality of tie rods, parallel to the axis of the pipe and uniformly distributed over the circumference
- Two concentric sheets of interwoven yarns or ribbons
- A thin cylindrical sleeve
- A loose grid forming a cylindrical crown ring (arranged as helices)

There is a need for an improved bend stiffener having superior properties.

DETAILED DESCRIPTION OF THE INVENTION

The invention will be described in detail with reference to the attached series of figures and accompanying descriptive text.

Figure 1:
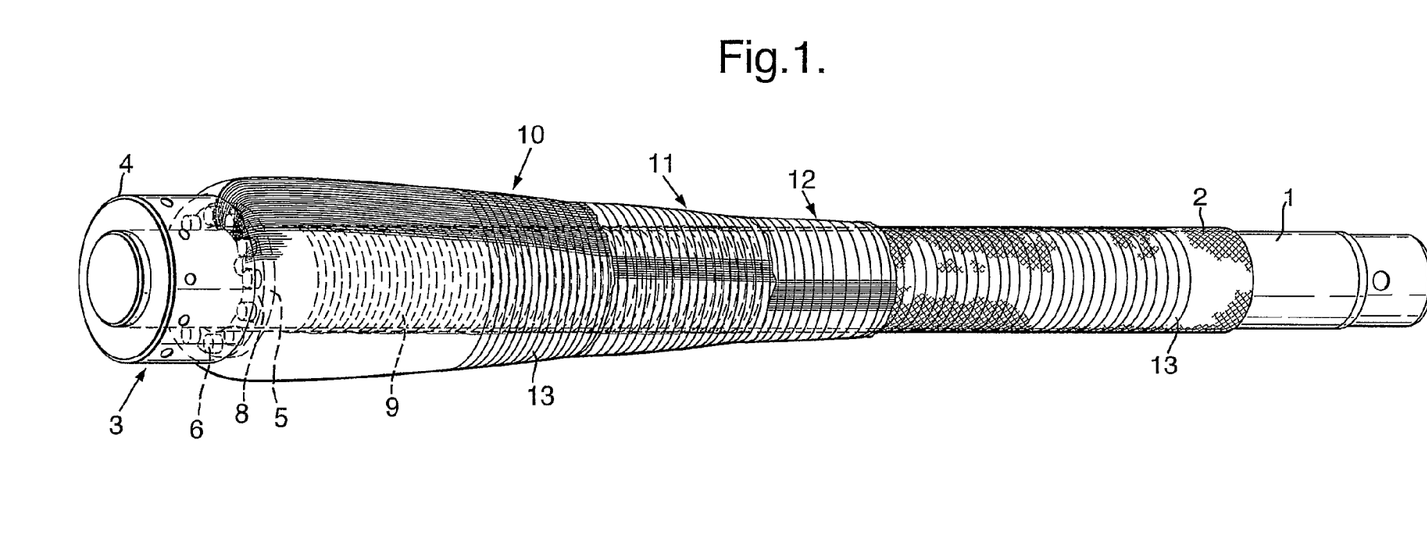
FIG. 1 is a perspective view of the internal structure according to one aspect of the invention
Figure 2:
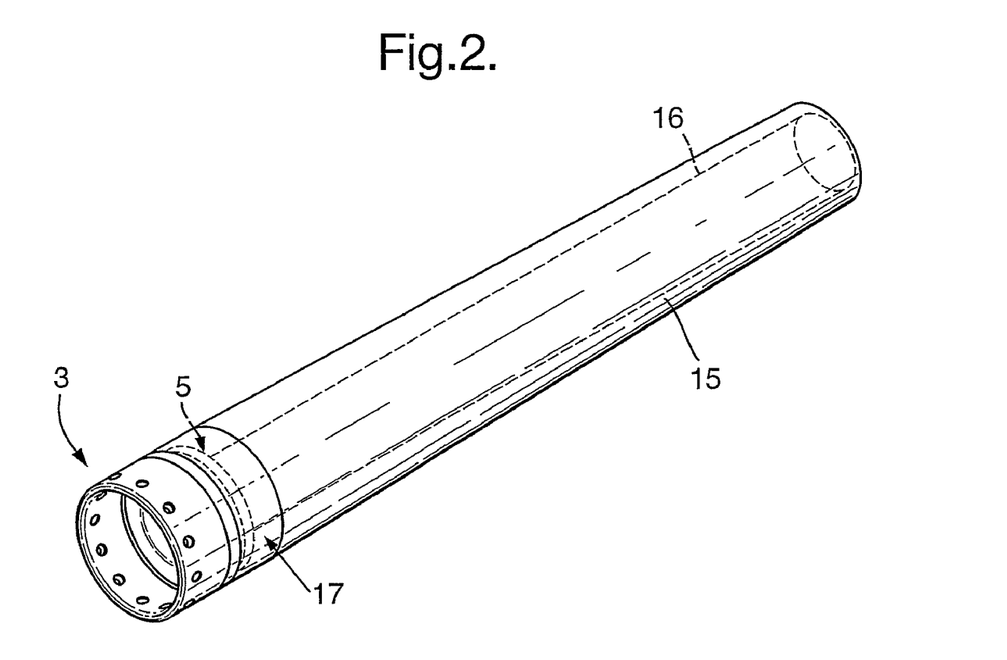
FIG. 2 is a perspective view of an embodiment of the invention
Figure 3:
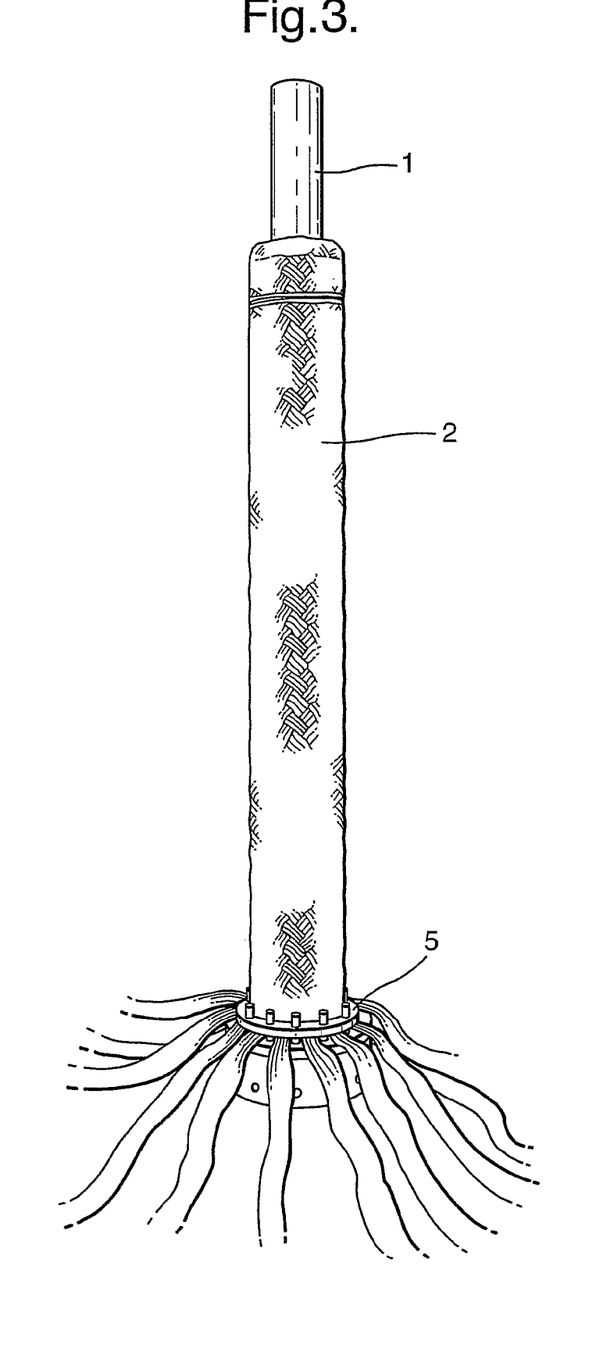
FIG. 3 is a perspective view showing a first internal layer of reinforcement fibers according to one aspect of the invention
Figure 9:
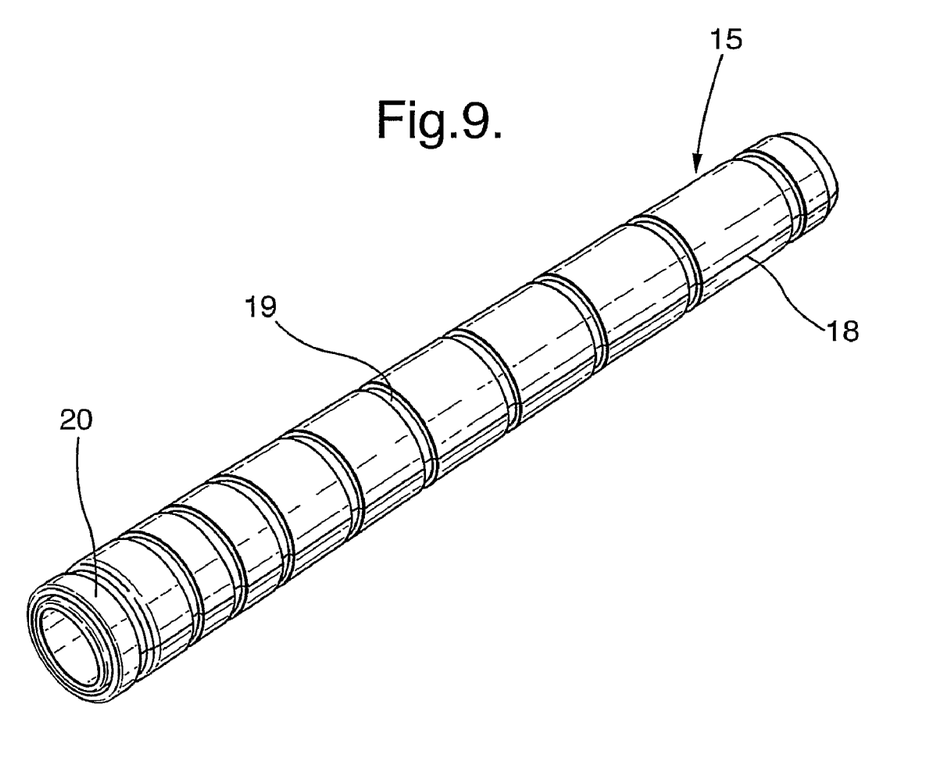
FIG. 9 is a perspective view of an alternative embodiment

According to one aspect of the invention a bend stiffener in the form of an elongated cylinder of polymer material is provided. FIGS. 1, 3, 4, 5, 6 and 7 show internal structures and the arrangement of the components of the bend stiffener according to one aspect of the invention. FIGS. 2 and 9 show perspective views of alternative embodiments of the invention, though not showing the internal structures that are located within the polymer material. In FIGS. 1, 3, 6 and 7, the internal components are arranged relative to an elongated, cylindrical center rod 1 that does not form a component of the bend stiffener itself, but serves as a template in the injection-moulding process forming a cylindrical center bore of the bend stiffener.

As shown, the internal components of the bend stiffener comprise a braided sock 2 of polymer fibers. The braided sock comprises a plurality of bundles woven together, said bundles being comprised of a plurality of filaments. As shown in FIG. 1, the braided sock 2 is arranged coaxially with, and pulled over the center rod prior to injection of the elastomer.

In some cases, the sock will be in direct contact with the center rod. In other cases, in order for example to build a thicker matrix layer between the reinforcement sock and the center rod, rings or shims may be added to keep the sock off the center rod.

It should be noted that the sock makes installation of reinforcement fibres easy. However, all material and manufacturing operations resulting in a reinforcement of cylindrical shape would do, as for instance a design where a sheet of braided fibres is wrapped around the center rod thus achieving a cylindrical form.

Although the sock will commonly be pulled over the whole length of the center rod, this is no obligation, and the required characteristics of the stiffener will determine that.

Figure 4:
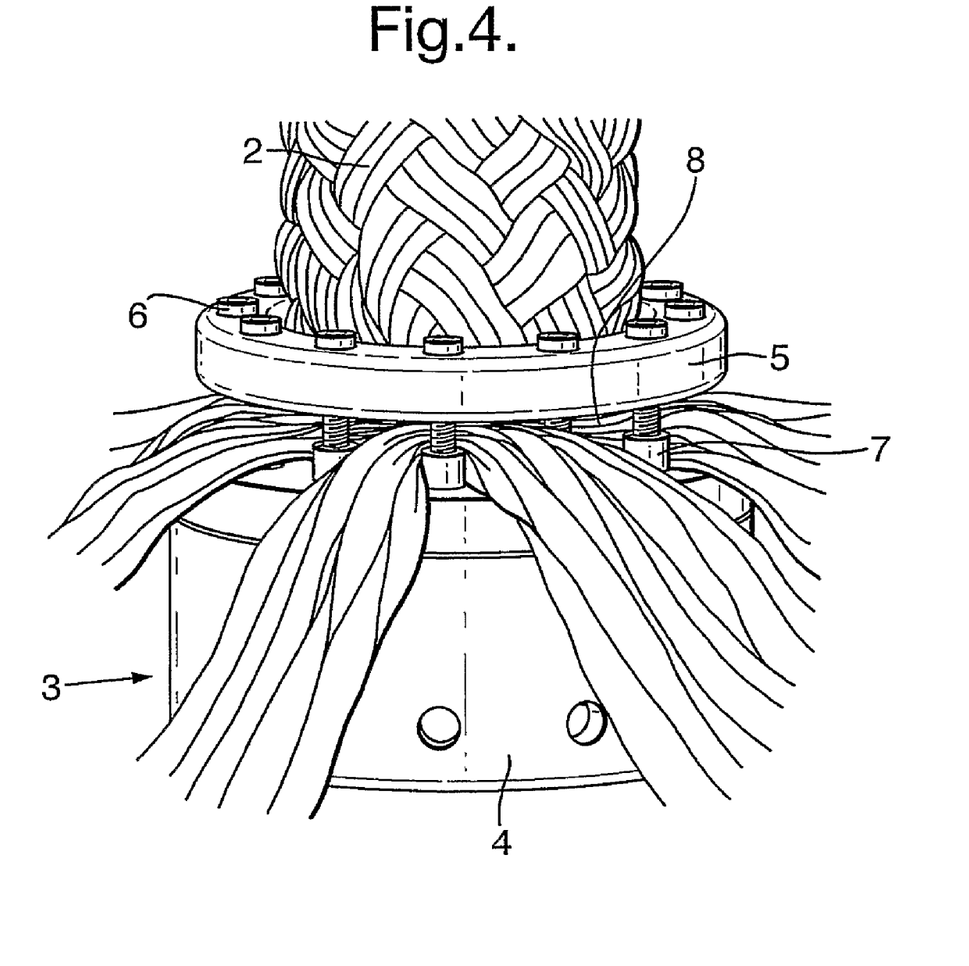
FIG. 4 is a detail view showing fibers passing through the retaining ring of the termination member
Figure 5:
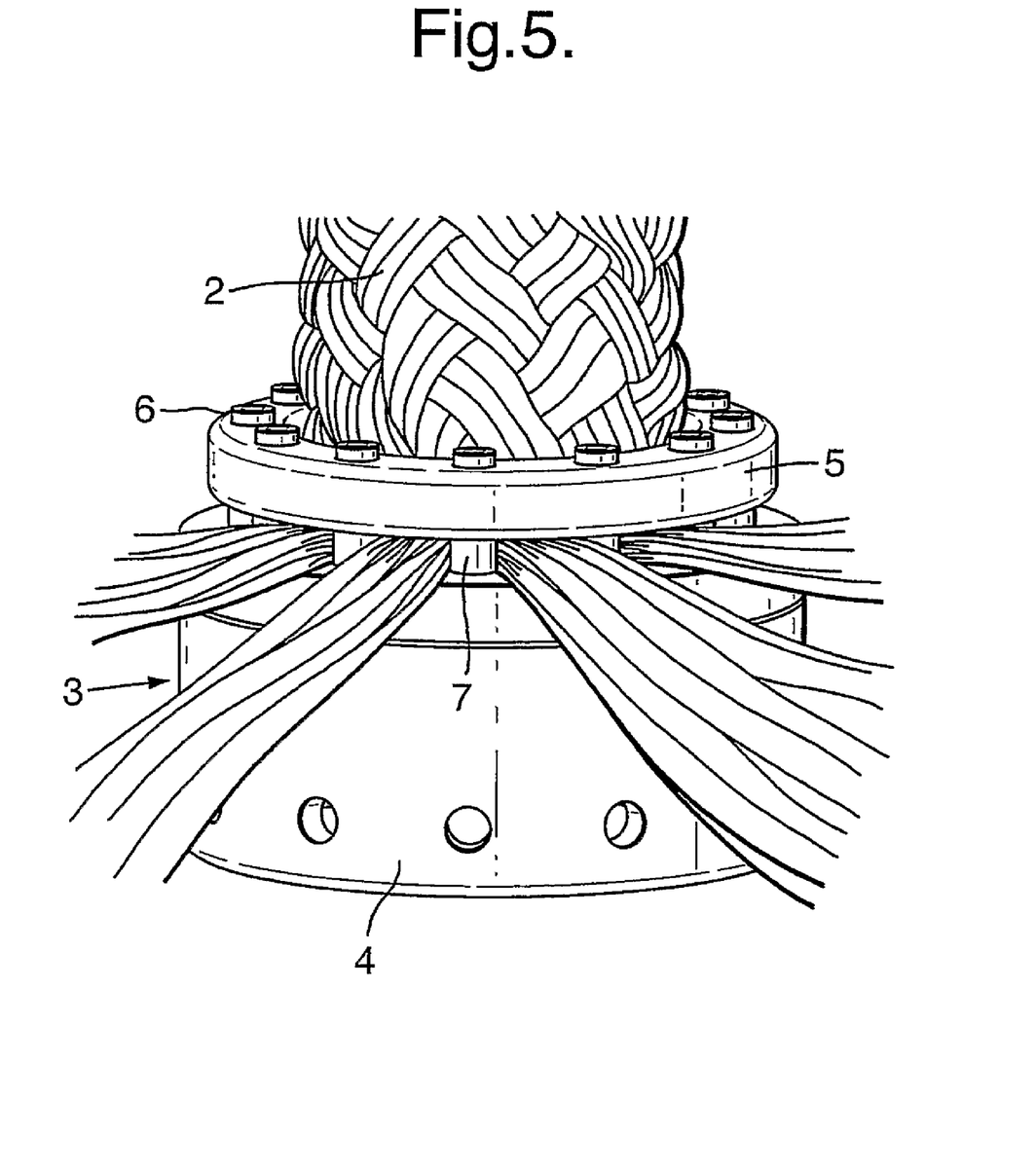
FIG. 5 is a detail view similar to FIG. 4, showing the bolts of the retaining ring pretensioned
Figure 6:
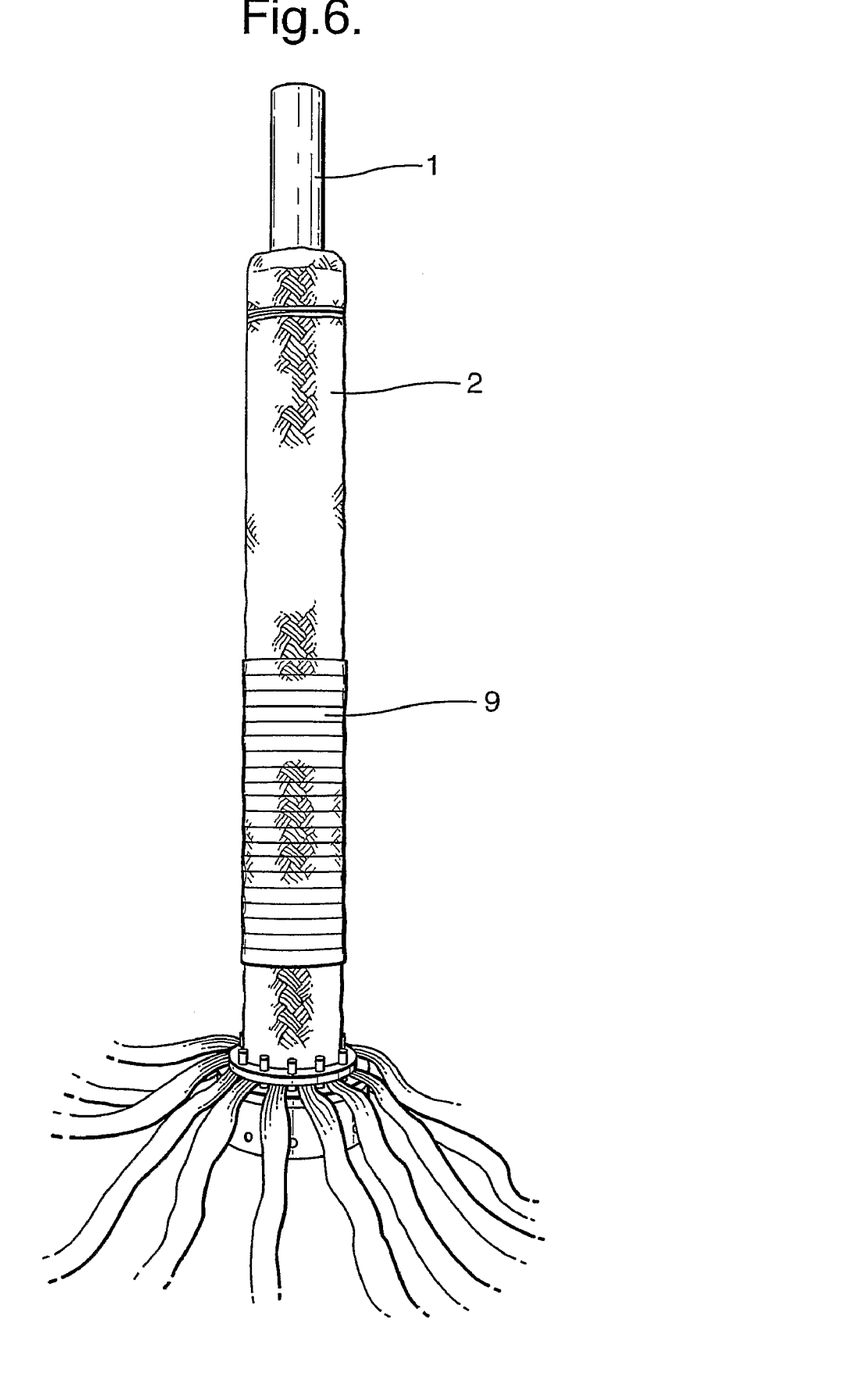
FIG. 6 is a perspective view showing a layer of hoop armour over the first reinforcement layer
Figure 8:
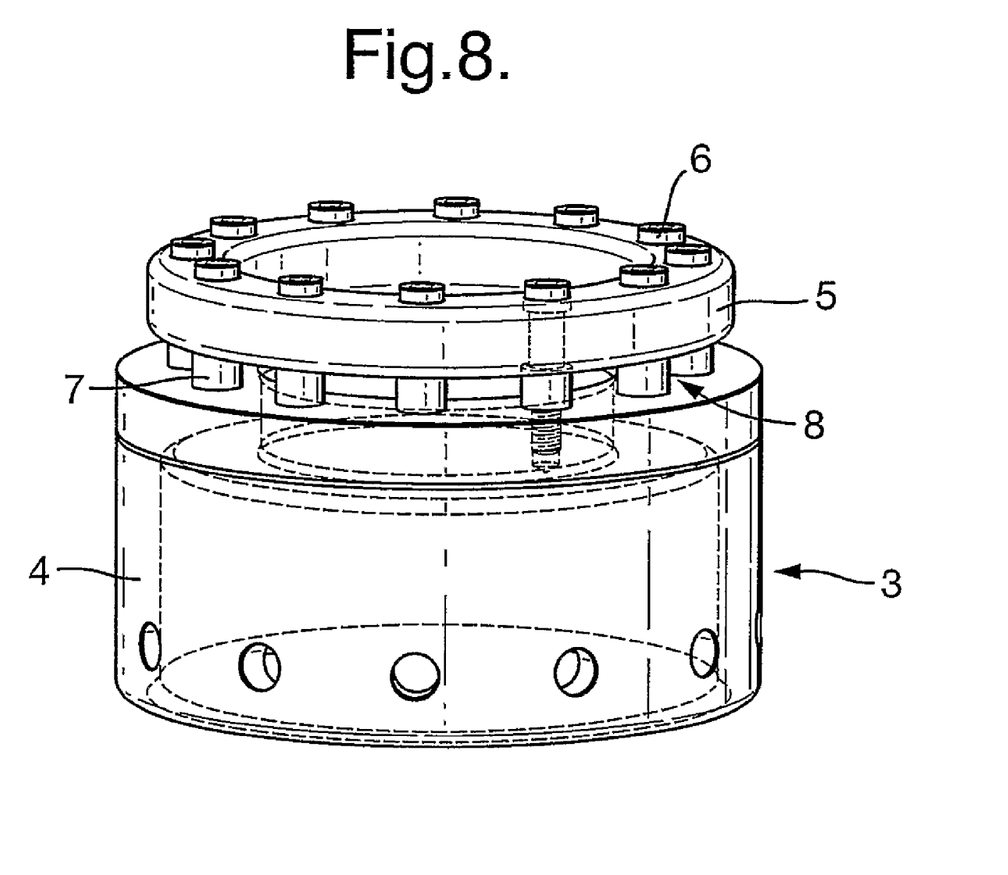
FIG. 8 is a detail view of the termination member

At the terminal end of the bend stiffener a termination member 3 is temporarily mounted on the center rod 1. The termination member comprises a termination interface 4 that cooperates with and attaches to corresponding attachment member of the structure to which is to be attached the cable or pipeline to be stiffened. The termination member further comprises a retaining ring 5 secured to the termination interface 4 by bolts 6. One or more spacers 7 as shown in FIGS. 4, 5 and 8 are arranged between the heads of bolts 6 and the inside surface of termination interface 4, such that a plurality of openings 8 exist between adjacent bolts. At the terminal end of the bend stiffener, the braided sock is unwoven to the level of bundles, and the bundles are passed between openings 8, as shown in FIGS. 3, 4, 5 and 6. The use of spacers 7 allows the bolts securing the retaining ring to the termination interface to be pre-tensioned without impinging upon the bundles passing through the openings 8, which would otherwise damage the filaments of the bundles. Such damage would be detrimental to the mechanical integrity of the reinforcement of the bend stiffener negatively affecting the stiffness and life expectancy of the device. Although not illustrated, it is possible to arrange a termination member at both ends of the stiffener for various applications.

After the bundles are passed though the openings 8, a flexible material, called for convenience "hoop armour" 9, is spirally wound around the still-woven braided sock surrounding the center rod 1. The material of the hoop armour may comprise the same or similar fibers as the first reinforcement layers, or may be a flexible band. The hoop armour 9 is spirally wound beginning from at or near the termination member to a specified distance down the length of the bend stiffener body. The distance is determined by the desired stiffness characteristics of the bend stiffener. The hoop armour provides stiffness to the bend stiffener by both being an additional reinforcement material, but also by the fact that the hoop armour maintains the circular cross section of the center bore of the bend stiffener body when the stiffener is bent, thus increasing stiffness. Such hoop armour may also be replaced by ring-shaped bands disposed around the sock at given intervals, or any other solution achieving same function.

Figure 7:
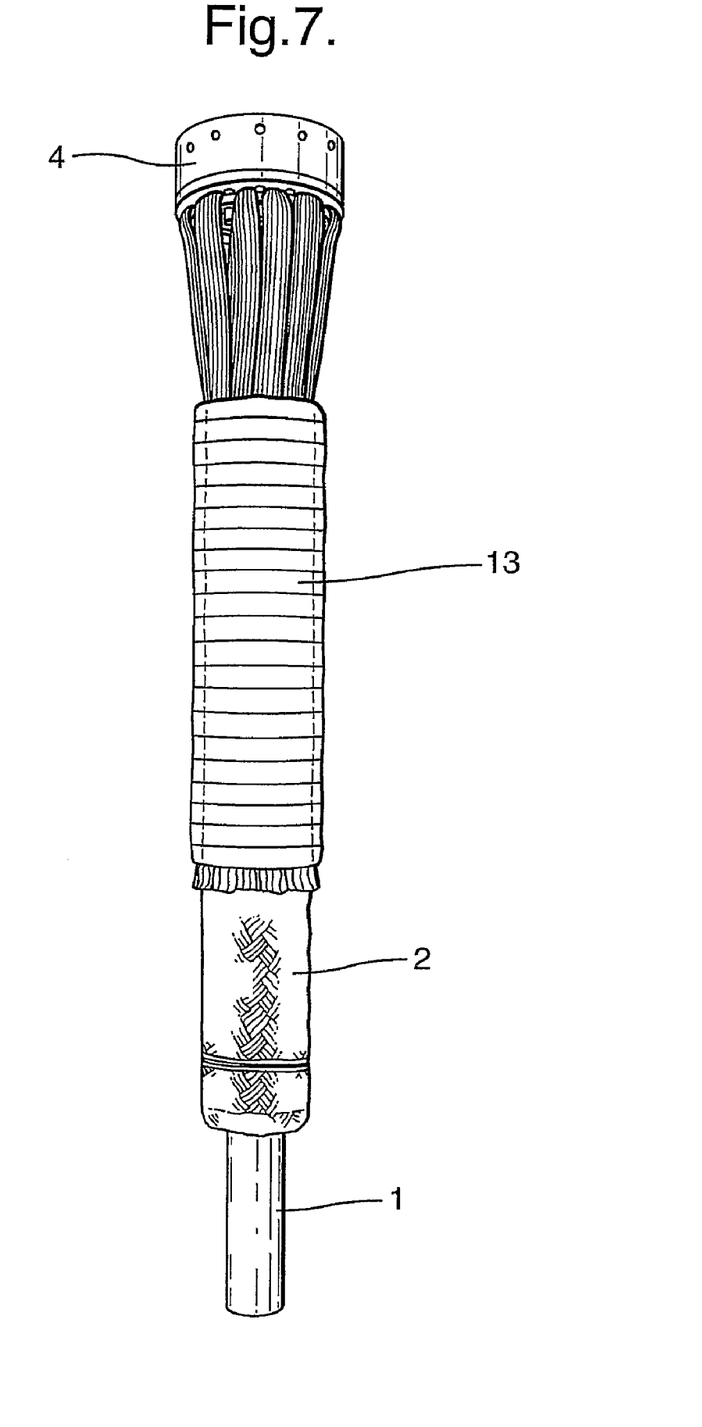
FIG. 7 is a perspective view showing a layer of hoop armour over a second reinforcement layer

After the hoop armour 9 has been secured, the bundles of the braided sock 2 are further unwoven to the individual filament level, as shown in FIGS. 1 and 7. The individual filaments allowed to drape down along the center rod, thus overlapping the hoop armour. The filaments may be preferably clipped at various intervals, such that zones of decreasing density of fibers are achieved. For example as shown in FIG. 1 a first zone 10 of maximum density comprises all of the returning fibers. Adjacent to first zone 10 is a second zone 11 comprising approximately ⅔ of the retuning fibers, followed by a third zone 12 comprising approximately ⅓ of the returning fibers, in turn possibly followed by a fourth zone comprising approximately ⅔ of the remaining ⅓ of fibers, etc. It should be noted that for illustration purposes, FIG. 1 only shows a portion of the fibers for each zone, but it should be understood that the fibers of each zone are arranged around the entire circumference. The staggered density of reinforcement fibers thus provides in the finished device a gradually decreasing stiffness. The length of the various zones and the density of the fibers in each zone are determined based upon the desired properties of the finished product. According to one aspect of the invention, as shown in FIG. 1, the fibers are arranged essentially parallel with the axis of the center rod 1. According to another aspect of the invention, the returning filaments may be arranged with a predetermined degree of spiralling. The degree of spiralling is determined based upon the expected extent of bending of the bend stiffener in relation to the elongation limits of the filaments. If the expected degree of bending would approach or exceed the elongation limit of the filaments, the filaments may be spiralled to decrease the elongation stresses on the filaments. According to other aspects of the invention, fibres may be arranged according to a combination both longitudinally and in spiral, and other aspects are possible, After the returning filaments are arranged in the desired pattern, they are secured by an outer hoop armour layer 13. As with hoop armour 9, the outer hoop armour layer 13 is arranged in a spiral along the length of the bend stiffener body. In contrast however, the outer hoop armour layer 13 begins at a predetermined distance from the retaining ring 5. This is ensures that the outer hoop layer does not overly compress the retuning fibers against the retaining ring. The distance is also chosen based upon the desired stiffness of the bend stiffener in the termination end. A greater stiffness is achieved when the retuning fibers slope gradually from the retaining ring to the braided sock 2.

After the outer hoop armour layer is secured, a cylindrical injection mould is affixed around the center rod, and an elastomer mixture is injected according to methods known in the art. After the elastomer has hardened, the mould is dismounted, and the center rod is extracted.

As shown in FIG. 2, the finished device comprises a reinforced elastomer body 15 having a cylindrical center bore 16. The termination member 3 is securely attached to the elastomer body by the fibers passing back through the retaining ring. In one embodiment of the invention, the outer surface of the elastomer body is cone shaped, with a relatively shorter cylindrical transition zone 17 immediately adjacent termination member 3. The transition zone helps prevents excessive bending near the termination member. By this slender construction the cylindrical transition zone 17 helps to ensure that the reinforcing fibres are entirely immersed in the elastomeric matrix. Note that the invention described here has a very short rigid cylindrical transition section, for example typically 5 cm, thereby generally reducing diameter and volume for such stiffener.

The bend stiffener according to the embodiment shown in FIG. 2 is used by first passing the bend stiffener over the cable, or conduit to be stiffened. The cable or conduit is thereafter terminated to its intended receiving structure. The bend stiffener is thereafter secured by attaching termination interface 4 to its cooperating member on the structure to which the cable or conduit is terminated.

FIG. 9 shows an alternate embodiment of the invention, which can be utilized with cable or conduits that are already terminated. According to this embodiment, a longitudinal split 18 is cut into one side of body 15. In this embodiment, the termination interface 4 and retaining ring 5 are also split, being formed as two halves. In this embodiment, the body 15 is physically opened at the split 18, and arranged over the cable or conduit. The body is thereafter secured by metal bands that are arranged in concentric grooves 19 in the outer surface of body 15. The halves of the metal components are secured to one another either by bolts, or by a locking ring 20 as shown in the figures. Testing has demonstrated that a stiffener split on a single side and secured in the above described fashion retains nearly all of the stiffness characteristics of an unsplit stiffener.

Whereas according to one aspect a stiffener is provided with one terminal end, a production process and structure as described here above can also be applied to a product with two terminal ends, i.e. a retaining ring at each end. There, flexibility may be symmetrical or asymmetrical, all depending on purpose. A product of this type could, in addition to functioning as a bend stiffener, function as a towing element, either as the primary towing element, as a fail-safe in the event the primary towing element (such as a cable) were to break, or as a general protection for cables —for instance seismic cables—during installation or pulling up on board.

As a primary towing element, hooking accessories are added around it to enable towing. As a fail-safe, self-locking rings may be mounted on both sides to block the rupture of cable on both ends.

The ends of the stiffened element may be any connection, or a free end, or an end with several functions.

Choice of Fiber and Elastomer

According to another aspect of the invention, a combination of fiber and elastomer results in an effective composite material. By this is meant a composite material in which all or nearly all of the individual filaments of the reinforcing fiber is saturated with the elastomer. According to this aspect of the invention, a density and weaving pattern of the fibers is employed that permits complete or near complete saturation of the individual monofilaments of the reinforcement fiber. The fibers according to one embodiment are free of any surface treatment, such as anti-seizing treatment, that would interfere with the bond between the elastomer and the filaments. According to this embodiment, the filaments tolerate the expected under water environment and temperatures up to approximately 90 Degrees C., and the elasticity of the fibers tolerate an elongation without breaking determined by the expected amount of bending of the stiffener, typically greater than 7% elongation but at the same time not being so elastic as to provide no reinforcement benefit.

Aramide was evaluated as a potential candidate, but found unsatisfactory. Aramide fibers showed a breaking point at approximately 3% elongation. Aramide could be used in the hoop armour, however, where the degree of elongation is significantly lower.

In one embodiment, the preferred fiber is a polyester fiber, although any fiber meeting the basic criteria could be employed. The most preferred fiber according to this embodiment is Diolen® 164S, produced by Diolen Industrial Fibers GmBH, Wuppertal, Germany The preferred weaving pattern is that of a cylindrical, braided polyester fiber sock, the fibers of which tolerate approximately 15% elongation.

In this embodiment an elastomer is chosen that exhibits certain characteristics in order to provide an optimal composite. The properties of the elastomer according to this embodiment are, among others:

- The compound must be environmentally friendly
- The material should possess the necessary hardness, preferably having a Shore A value of between 80-95, most preferably near 95.
- The material should have a gel time sufficient to allow saturation of the individual filaments prior to hardening, preferably at least 3 minutes, more preferably over 9 minutes.
- The elastomer must also tolerate under water conditions and expected temperatures
- The material must cooperate with the chosen fibers to form a functioning composite material Based on the above criteria, the preferred elastomer for this embodiment is polyurethane, although any elastomer meeting the basic criteria could be employed, more specifically, MDI-type isocyanate PU. The most preferred polyurethane is Hyperlast® 200/95, produced by Hyperlast Ltd, Birchvale UK.

The invention claimed is:

1. A stiffener for an elongated structure comprising
   a. An elongated elastomer body having a longitudinal center bore,
   b. A termination interface affixed to at least one end of the elongated elastomer body,
   c. A first reinforcement layer of a woven fiber material, said woven material comprising a plurality of filaments braided into bundles that are woven together, said woven material being circumferentially disposed within the elastomer material of the elongated body and arranged at least partially along the longitudinal length of the elongated body, and
   d. A second reinforcement layer disposed within the elastomer material of the elongated body, said second layer comprising a plurality of at least partially unwoven and unbraided filaments in continuous extension from the material of the first reinforcement layer, said filaments engaging a retention member of the termination interface and passing back along the length of the elongated body, at least partially overlapping the first reinforcement layer.

2. A stiffener according to claim 1, wherein a plurality of the filaments of the second reinforcement layer are cut to a plurality of predetermined lengths and arranged such that regions of decreasing fiber density are created along the length of the second reinforcement layer from the termination end.

3. A stiffener according to claim 1, wherein the material of the first reinforcement layer is a tubular, woven sock.

4. A stiffener according to claim 1, further comprising a third reinforcement layer, wound spirally around at least a portion of the first reinforcement layer.

5. A stiffener according to claim 4, further comprising a fourth reinforcement layer, wound spirally around at least a portion of the second reinforcement layer.

6. A stiffener according to claim 1, further comprising means adapted to maintain the circular cross section of the stiffener when the stiffener is bent.

7. A stiffener according to claim 1, wherein the retention member is a retention ring affixed to the termination member, and the filaments engage the retention member by passing over the retention ring.

8. A stiffener according to either of claims 1-7, wherein the elongated body is split longitudinally along one side.

9. A stiffener according to claim 1, wherein the fibers of the first and second reinforcement layers are substantially free of anti-seizing surface treatment, and the density and weaving pattern of the material of the first reinforcement layer permit substantially complete saturation of the individual monofilaments with the elastomer material of the elongated body.

10. A stiffener according to claim 1, wherein the fibers of the first and second reinforcement layers have an elongation tolerance greater than 7%.

11. A stiffener according to claim 1, wherein the fibers are Diolen® 164S.

12. A stiffener according to claim 4 or 5, wherein the material of the third and fourth reinforcement layers comprises fibers of the same material as the first and second reinforcement layers.

13. A stiffener according to claim 4 or 5, wherein the material of the third and fourth reinforcement layers is made of aramide.

14. A stiffener according to claim 1, wherein the elastomer body comprises a material having a Shore A value between 80-95.

15. A method for manufacturing a stiffener for an elongated body, comprising:
   a. Providing an elongated, cylindrical rod as a template,
   b. Providing a woven polymer fiber material,
   c. Circumferentially surrounding the cylindrical rod with the woven polymer fiber material formimg a sock,
   d. Removably attaching a termination interface to the cylindrical rod, said termination interface comprising a retention ring,
   e. At least partially unweaving the woven polymer fiber material at the termination end, and passing the at least partially unwoven fibers over the retention ring and back along at least part of the length of the sock,
   f. Arranging a cylindrical injection mould about the cylindrical rod,
   g. Injecting a polymerizable elastomer mixture into the mould,
   h. Allowing the elastomer to harden,
   i. Removing the center rod.

16. The method of claim 15, wherein the woven polymer fiber material is a tubular, woven sock.

17. The method of claims 15, wherein a plurality of the returning fibers are cut to a predetermined length, and arranged in regions of varying fiber density.

18. The method of claim 15, wherein a flexible material is spirally wound around the woven polymer fiber material prior to passing the unwoven fibers back along the length of the woven polymer fiber material.

19. The method of claim 15, wherein a flexible material is spirally wound around the returning fibers.

* * * * *